(12) United States Patent
Takahashi (10) Patent No.: US 6,995,524 B2
(45) Date of Patent: Feb. 7, 2006

(54) DISCHARGE LAMP STARTER

(75) Inventor: Hiromitsu Takahashi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 41 days.

(21) Appl. No.: 10/803,905

(22) Filed: Mar. 19, 2004

(65) Prior Publication Data

US 2004/0195980 A1    Oct. 7, 2004

(30) Foreign Application Priority Data

Apr. 7, 2003    (JP)    ............... 2003-103196

(51) Int. Cl.
*G05F 1/00*    (2006.01)
*H02H 3/18*    (2006.01)

(52) U.S. Cl. ........................ 315/307; 361/79

(58) Field of Classification Search ................ 315/77, 315/80, 82, 83, 307, 308; 307/10.8; 361/79, 361/86, 90, 139, 144
See application file for complete search history.

(56) References Cited

U.S. PATENT DOCUMENTS

| | | | |
|---|---|---|---|
| 6,038,883 A * | 3/2000 | Pfister et al. | 62/480 |
| 6,393,382 B1 * | 5/2002 | Williams et al. | 702/188 |
| 6,472,829 B2 * | 10/2002 | Ito et al. | 315/307 |
| 6,534,930 B2 * | 3/2003 | Ito et al. | 315/291 |
| 6,552,501 B2 * | 4/2003 | Ito et al. | 315/308 |

FOREIGN PATENT DOCUMENTS

JP    2001-347880 A    12/2001

* cited by examiner

*Primary Examiner*—Wilson Lee
*Assistant Examiner*—Minh Dieu A
(74) *Attorney, Agent, or Firm*—Sughrue Mion, PLLC (57) ABSTRACT

A discharge lamp starter includes a discharge lamp that is lit at a luminance corresponding to power supplied, and a discharge lamp start control unit. The discharge lamp start control unit, receiving a signal indicating an on state only from a first switch, causes the discharge lamp to perform daytime running light by supplying first power to the discharge lamp to start lighting, followed by supplying second power smaller than the first power to the discharge lamp to maintain lighting. Receiving a signal indicating an on state only from a second switch, the discharge lamp start control unit causes the discharge lamp to perform nighttime running light by supplying third power greater than the first power to the discharge lamp to start lighting, followed by supplying fourth power smaller than the third power and greater than the second power to the discharge lamp to maintain lighting.

6 Claims, 6 Drawing Sheets

DISCHARGE LAMP STARTER

BACKGROUND OF THE INVENTION

1. Field of the Invention

The present invention relates to a discharge lamp starter for controlling lighting of a discharge lamp used for the headlights of vehicles, for example.

2. Description of Related Art

It is sometimes necessary for vehicles such as automobiles and motorcycles to travel with lighting the headlights even during the daytime in order to improve visibility from oncoming vehicles to maintain traffic safety. To meet such a need, a headlight control unit has been developed for carrying out the daytime running light (abbreviated to "DRL" from now on) in addition to the normal nighttime running light (called "normal light" from now on) (see the following Relevant Reference 1, for example).

The headlight control unit turns on the headlights at a specified luminance required for the normal light during the night. In contrast, during the daytime, it varies the luminance of the headlights within the luminance less than that required for the normal light in response to the brightness outside the vehicle detected by a photodetector.

With the configuration, the conventional headlight control unit can prevent the drivers of oncoming vehicles and pedestrians from being dazzled by the headlights during the daytime running light in a rather light environment. In addition, since it can prevent the excess luminance of the headlights, it can curb the waste of power. Furthermore, since it enables the headlights to provide enough luminance to a rather dark environment, it can prevent the reduction in the visibility of the drivers of the oncoming vehicles and pedestrians.

Relevant Reference 1: Japanese patent application laid-open No. 2001-347880.

Recently, high-intensity discharge lamps (called HID lamps from now on) such as metal halide bulbs, high-pressure sodium bulbs and mercury bulbs have been applied to the headlights of vehicles because they have advantages of large luminous flux, high lamp efficiency and long life.

The HID lamps, however, require large power at the turn on because of the necessity to increase the temperature of the electrodes. The electrodes of the HID lamps are impaired because they are scattered by the large current at the start. Because of an increasing number of times of turn on and off of the HID lamps during the DRL control, the electrodes of the HID lamps are impaired more severely in the DRL control than in the normal light control. As a result, the life of the HID lamps is reduced so that users must replace the HID lamps at short intervals, thereby imposing a heavy load on the users.

In addition, when switched from the normal light to the DRL, the HID lamps can reduce the luminance abruptly and impair the visibility, which is unfavorable for the drivers.

SUMMARY OF THE INVENTION

The present invention is implemented to solve the foregoing problems. It is therefore an object of the present invention to provide a discharge lamp starter capable of maintaining the life of the discharge lamp in spite of the daytime running light.

Another object of the present invention is to provide a discharge lamp starter capable of preventing the sudden impairment of the visibility in spite of switching from the normal light to the DRL.

According to one aspect of the present invention, there is provided a discharge lamp starter comprising: a discharge lamp that is lit at a luminance corresponding to power supplied; a first switch and a second switch for turning on and off a power supply circuit; and a discharge lamp start control unit for causing the discharge lamp to carry out daytime running light when the discharge lamp start control unit receives a signal indicating an on state only from the first switch, by supplying first power to the discharge lamp to start lighting, followed by supplying second power smaller than the first power to the discharge lamp to maintain lighting; and for causing the discharge lamp to carry out nighttime running light when the discharge lamp start control unit receives a signal indicating an on state only from the second switch, by supplying third power greater than the first power to the discharge lamp to start lighting, followed by supplying fourth power smaller than the third power and greater than the second power to the discharge lamp to maintain lighting.

The discharge lamp start control unit can cause the discharge lamp to make transition from the daytime running light to the nighttime running light when the discharge lamp start control unit receives the signal indicating the on state of the second switch during the daytime running light, by changing the power supplied to the discharge lamp from the second power to the fourth power; and can cause the discharge lamp to make transition from the nighttime running light to the daytime running light when the discharge lamp start control unit receives a signal indicating an off state of the second switch during the nighttime running light, by continuously reducing the power supplied to the discharge lamp from the fourth power to the second power.

Thus, it can suppress the current flowing across the electrodes of the discharge lamp when it starts lighting of the discharge lamp in the DRL mode. As a result, it can curb the degradation of the electrodes of the discharge lamp, thereby being able to prolong the life of the discharge lamp.

In addition, it can prevent the sudden impairment of the visibility involved in the sudden fall of the luminance of the discharge lamp.

DETAILED DESCRIPTION OF THE PREFERRED EMBODIMENTS

The invention will now be described with reference to the accompanying drawings. It is assumed in the following embodiment that the discharge lamp starter is mounted on a vehicle.

Embodiment 1

Figure 1:
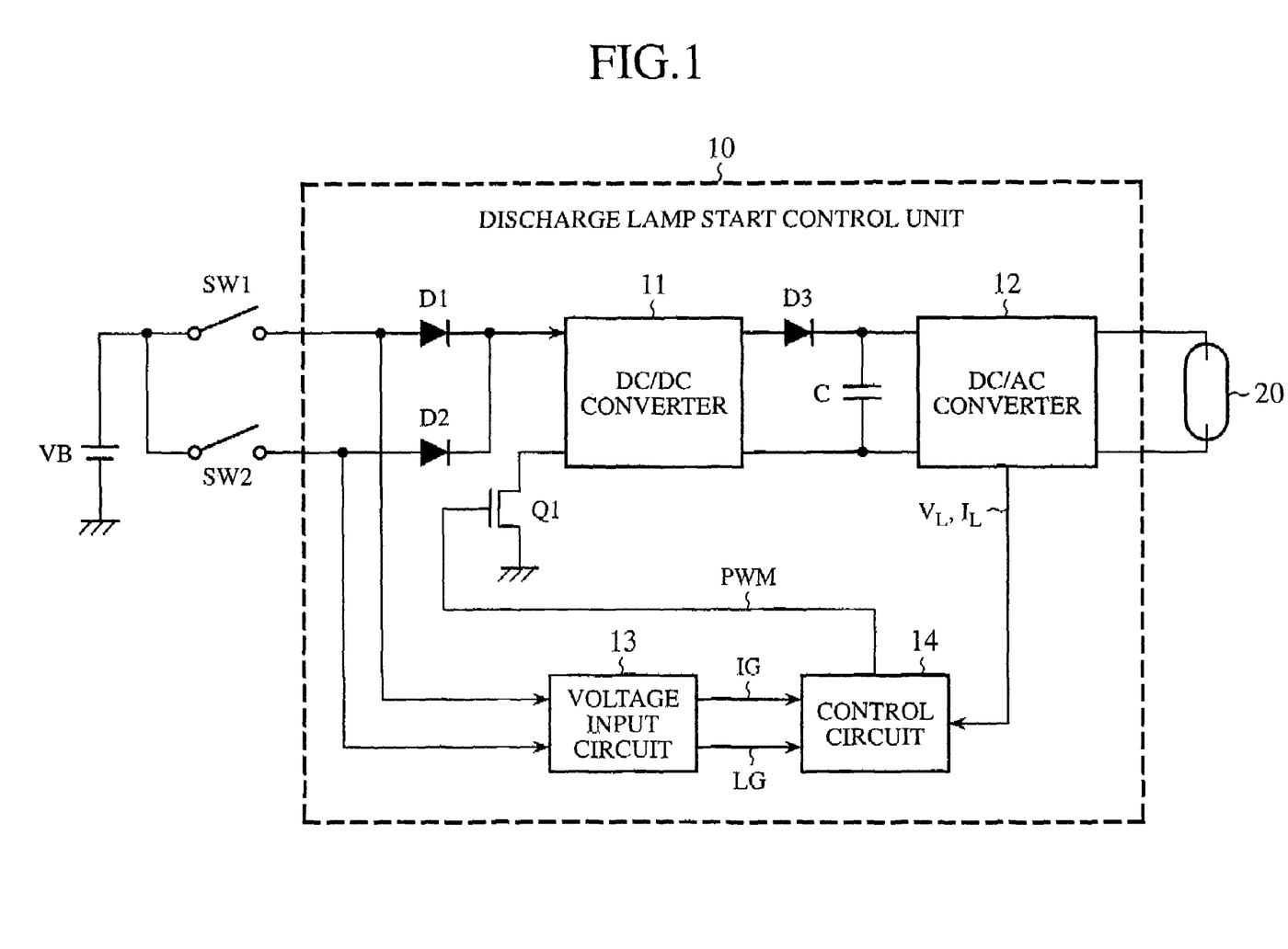
FIG. 1 is a block diagram showing a configuration of an embodiment 1 of the discharge lamp starter in accordance with the present invention.

FIG. 1 is a block diagram showing a configuration of an embodiment 1 of the discharge lamp starter in accordance with the present invention. The discharge lamp starter comprises a battery VB, an ignition switch SW1, a lighting switch SW2, a discharge lamp start control unit 10 and a discharge lamp 20.

The battery VB serves as the power supply of the discharge lamp starter. The battery VB serves not only as the power supply of the discharge lamp starter, but also as the power supply of electrical components mounted on the vehicle such as lamps and power windows. The power output from the battery VB is supplied to the discharge lamp start control unit 10 via the ignition switch SW1 and lighting switch SW2.

The discharge lamp 20 consists of a high-intensity discharge lamp (HID lamp) such as a metal halide bulb, high-pressure sodium bulb or mercury bulb. When supplied with a high voltage three or four times higher than the maximum value of the rated voltage from the discharge lamp start control unit 10, the discharge lamp 20 brings about the discharge because of the gases filled in the discharge lamp 20, thereby starting lighting. Once the lighting has been started, the rated AC voltage in the form of a square wave is supplied to maintain the lighting.

The ignition switch SW1 is provided to start the engine (not shown) of the vehicle on which the discharge lamp starter is mounted. Accordingly, when the engine is started, the battery VB automatically supplies the discharge lamp starter with the power, thereby lighting the discharge lamp 20 in the daytime running light (DRL) mode. Here, the term "DRL mode" refers to a mode in which the discharge lamp 20 is lit with rather small second power P2 of 29 W, for example. The DRL mode is used when the vehicle travels during the daytime. In the DRL mode, the discharge lamp 20 is lit at such a low luminance as to prevent the reduction of the visibility of the drivers of the oncoming vehicles and pedestrians. Thus, it can prevent the waste of the battery VB and the degradation in the electrodes due to the current flowing through the discharge lamp 20.

The lighting switch SW2 is used to light the discharge lamp 20 in the normal light mode. The term "normal light mode" refers to a mode in which the discharge lamp 20 is lit at rather large fourth power P4 such as 35 W. The normal light mode is used when the vehicle travels during the night. In the normal light mode, the discharge lamp 20 is lit at a high luminance that enables the driver to make visual identification of the drivers of the oncoming vehicles and pedestrians easily.

The discharge lamp start control unit 10 comprises a first diode D1, a second diode D2, a DC/DC converter 11, a third diode D3, a capacitor C, a DC/AC converter 12, a voltage input circuit 13, a control circuit 14 and a MOS transistor Q1 serving as a switching device.

The DC power output from the battery VB is supplied to the voltage input circuit 13 in the discharge lamp start control unit 10 via the ignition switch SW1, and to the DC/DC converter 11 via the first diode D1. The DC power output from the battery VB is also supplied to the voltage input circuit 13 in the discharge lamp start control unit 10 via the lighting switch SW2, and to the DC/DC converter 11 via the second diode D2. The cathode of the first diode D1 is connected to the cathode of the second diode D2. Thus, the DC/DC converter 11 is supplied with the DC power when at least one of the ignition switch SW1 and the lighting switch SW2 is conducting.

The DC/DC converter 11 includes a transformer, for example. The DC power input to the primary side of the transformer is chopped by the MOS transistor Q1 to be converted to a square wave voltage. The square wave voltage is varied by the transformer and is output from the secondary side.

The third diode D3 and capacitor C connected to the output of the DC/DC converter 11 constitute a rectifying-smoothing circuit. The square wave voltage output from the DC/DC converter 11 undergoes the rectification and smoothing by the rectifying-smoothing circuit, and is converted to the DC voltage to be supplied to the DC/AC converter 12.

The DC/AC converter 12 converts the DC voltage output from the rectifying-smoothing circuit to an AC voltage in the form of a square wave, and supplies it to the discharge lamp 20. In addition, the DC/AC converter 12 feeds the voltage and current supplied to the discharge lamp 20 back to the control circuit 14 as an output voltage signal $V_L$ and an output current signal $I_L$.

The voltage input circuit 13 generates an ignition switch signal (called "IG signal" from now on) indicating the on or off state of the ignition switch SW1 in accordance with the presence or absence of the voltage supplied from the battery VB via the ignition switch SW1, and supplies it to the control circuit 14. More specifically, when the ignition switch SW1 is turned on, the voltage of the battery VB is applied to the voltage input circuit 13 via the ignition switch SW1. Thus, the voltage input circuit 13 turns on the IG signal. On the contrary, when the ignition switch SW1 is turned off, the voltage of the battery VB is removed from the voltage input circuit 13, and hence the voltage input circuit 13 turns off the IG signal.

The voltage input circuit 13 generates a lighting switch signal (called "LG signal" from now on) indicating the on or off state of the lighting switch SW2 in accordance with the presence or absence of the voltage supplied from the battery VB via the lighting switch SW2, and supplies it to the control circuit 14. More specifically, when the lighting switch SW2 is turned on, the voltage of the battery VB is applied to the voltage input circuit 13 via the lighting switch SW2. Thus, the voltage input circuit 13 turns on the LG signal. On the contrary, when the lighting switch SW2 is turned off, the voltage of the battery VB is removed from the voltage input circuit 13, and hence the voltage input circuit 13 turns off the LG signal.

Figure 2:
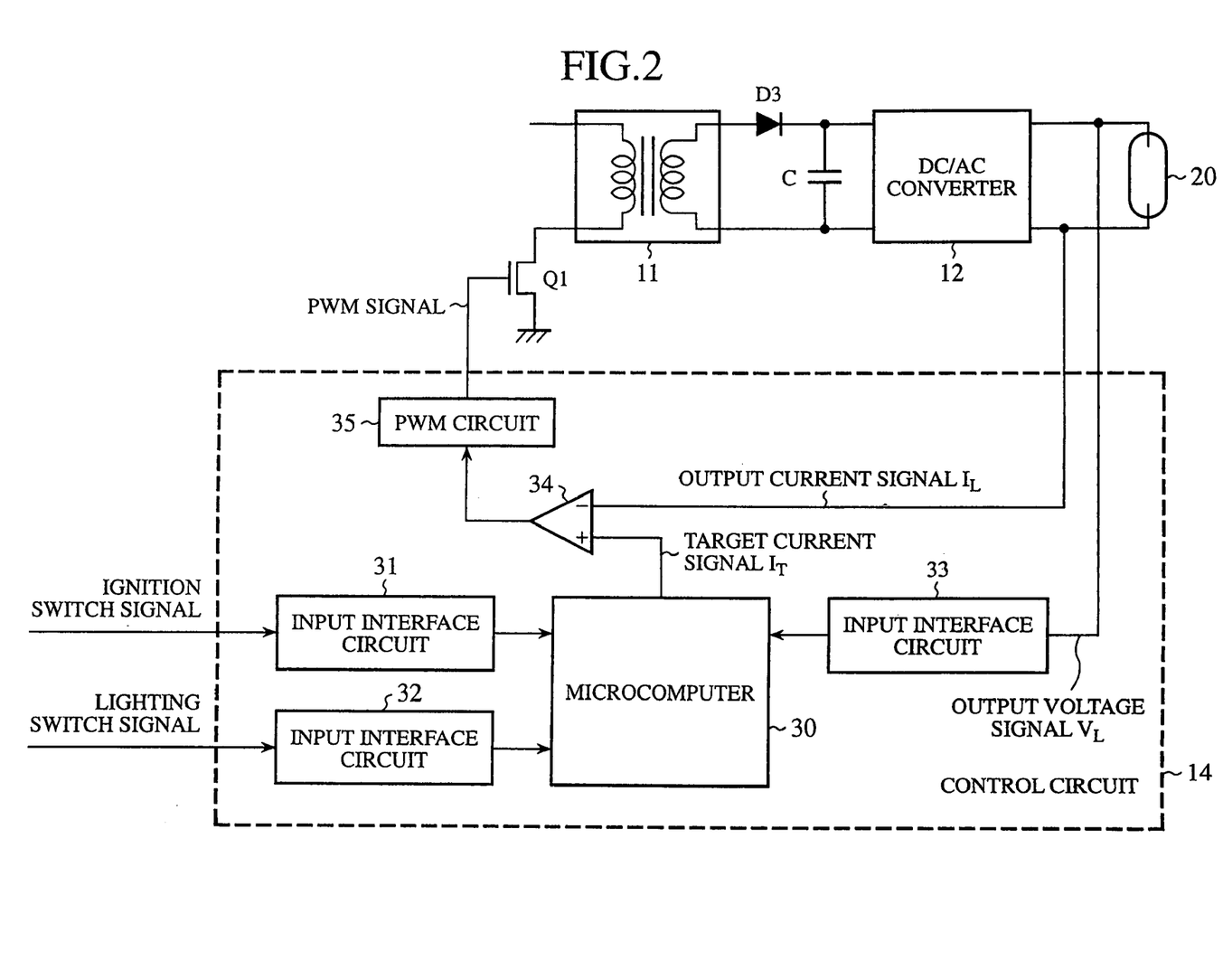
FIG. 2 is a circuit diagram showing a configuration of the discharge lamp start control unit as shown in FIG. 1.

The control circuit 14 comprises a microcomputer 30, a first input interface circuit 31, a second input interface circuit 32, a third input interface circuit 33, an error amplifier 34 and a PWM circuit 35 as shown in FIG. 2.

The first input interface circuit 31 converts the level of the IG signal fed from the voltage input circuit 13 to a logic level, and supplies it to the microcomputer 30. The second input interface circuit 32 converts the level of the LG signal fed from the voltage input circuit 13 to the logic level, and supplies it to the microcomputer 30. The third input interface circuit 33 converts the level of the output voltage signal $V_L$ fed from the DC/AC converter 12 to the logic level, and supplies it to the microcomputer 30.

According to the IG signal and LG signal fed from the voltage input circuit 13, and the output voltage signal $V_L$ fed from the DC/AC converter 12, the microcomputer 30 generates a target current signal $I_T$, and supplies it to the error amplifier 34. The target current signal $I_T$ is a signal indicating a target value of the current output from the DC/AC converter 12.

The error amplifier 34 calculates the difference between the output current signal $I_L$ output from the DC/AC converter 12 and the target current signal $I_T$ fed from the microcomputer 30, and supplies it to the PWM circuit 35 as an error signal.

The PWM circuit 35 generates a pulse width modulation signal (PWM signal) with the pulse width corresponding to the error signal fed from the error amplifier 34. The PWM signal is supplied to the gate of the MOS transistor Q1.

The MOS transistor Q1 has its drain and source connected in series to the primary winding of the transformer constituting the DC/DC converter 11. The MOS transistor Q1 is turned on and off in response to the PWM signal fed to the gate from the PWM circuit 35 to interrupt the DC power supplied to the primary side winding of the transformer constituting the DC/DC converter 11. Thus, the primary side of the transformer is supplied with the square wave voltage.

The duration in which the MOS transistor Q1 conducts is determined by the pulse width of the PWM signal. Accordingly, the pulse width of the square wave voltage supplied to the primary side of the transformer is varied by the pulse width of the PWM signal. Thus, the DC/DC converter 11 outputs the effective DC power corresponding to the PWM signal. As a result, the DC/AC converter 12 outputs the AC power corresponding to the PWM signal.

A concrete example of the control by the discharge lamp start control unit 10 will now be described. First, the operation to increase the AC power output from the discharge lamp start control unit 10 will be described. In this case, the microcomputer 30 supplies the error amplifier 34 with the target current signal $I_T$ greater than the output current signal $I_L$ fed from the DC/AC converter 12. In response to it, the error amplifier 34 generates a positive error signal, and supplies it to the PWM circuit 35. In response to the positive error signal, the PWM circuit 35 generates the PWM signal with greater pulse width, and supplies it to the gate of the MOS transistor Q1. Thus, the effective DC power output from the DC/DC converter 11 is increased, and the output current signal $I_L$ output from the DC/AC converter 12 is increased so that it agrees with the target current signal $I_T$. As a result, the DC/AC converter 12 outputs the AC power corresponding to the target current signal $I_T$.

Next, the operation to decrease the AC power output from the discharge lamp start control unit 10 will be described. In this case, the microcomputer 30 supplies the error amplifier 34 with the target current signal $I_T$ smaller than the output current signal $I_L$ fed from the DC/AC converter 12. In response to it, the error amplifier 34 generates a negative error signal, and supplies it to the PWM circuit 35. In response to the negative error signal, the PWM circuit 35 generates the PWM signal with narrower pulse width, and supplies it to the gate of the MOS transistor Q1. Thus, the effective DC power output from the DC/DC converter 11 is decreased, and the output current signal $I_L$ output from the DC/AC converter 12 is decreased so that it agrees with the target current signal $I_T$. As a result, the DC/AC converter 12 outputs the AC power corresponding to the target current signal $I_T$.

Next, the operation of the embodiment 1 of the discharge lamp starter in accordance with the present invention with the foregoing configuration will be described.

Figure 3A:
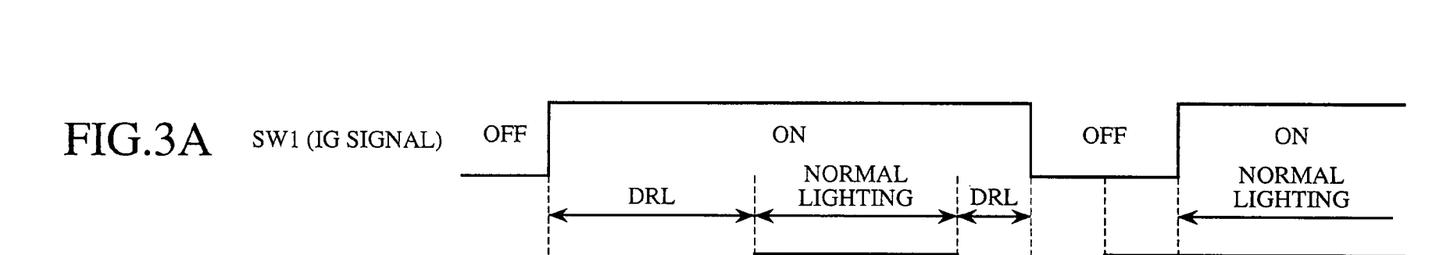
FIG. 3 is a timing chart illustrating the operation of the embodiment 1 of the discharge lamp starter in accordance with the present invention.
Figures 3B, 3C:
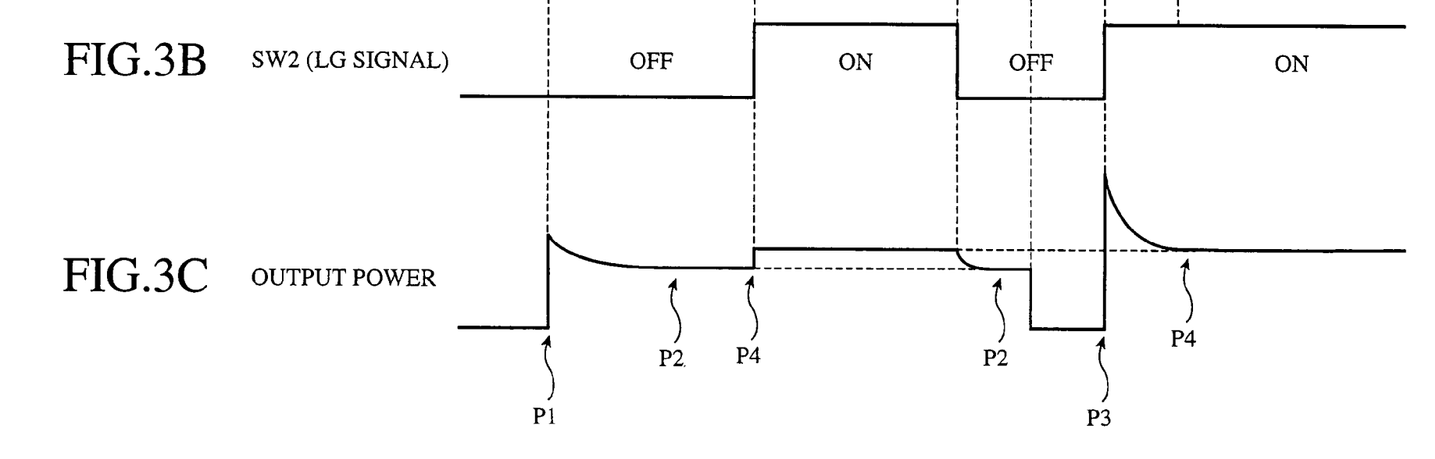

FIG. 3 is a timing chart schematically illustrating the operation of the lighting control of the discharge lamp 20 carried out in response to the turning on and off of the ignition switch SW1 and lighting switch SW2.

First, the operation of entering the DRL mode will be described when the lighting switch SW2 is in the off state and only the ignition switch SW1 is turned on. When the ignition switch SW1 is turned on, the voltage input circuit 13 enables the IG signal. In contrast, since the lighting switch SW2 continues the off state, the voltage input circuit 13 disables the LG signal.

Figure 4A:
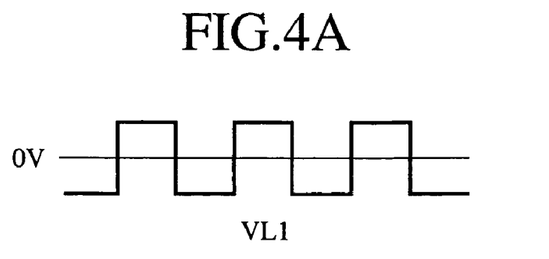
FIG. 4 is a timing chart illustrating the start operation of the embodiment 1 of the discharge lamp starter in accordance with the present invention.
Figure 4B:
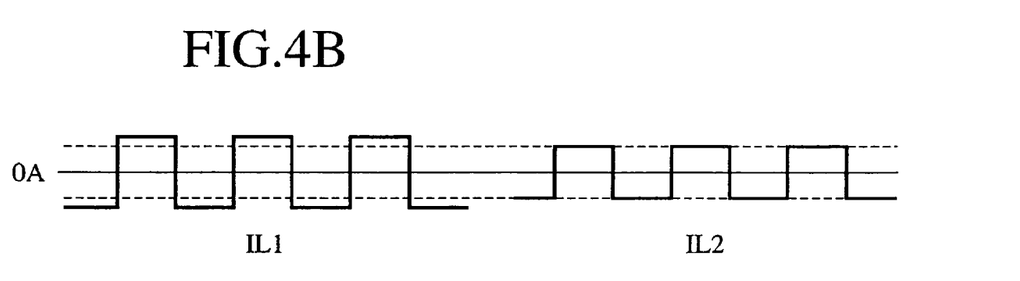

Detecting that the IG signal fed from the voltage input circuit 13 is enabled, and the LG signal is disabled, the microcomputer 30 in the control circuit 14 supplies first power P1 of a rather small amount (35 W, for example) to the discharge lamp 20 to start the lighting in the DRL mode. The operation is carried out by supplying the error amplifier 34 with the target current signal $I_T$ corresponding to the first power P1. Incidentally, supply of any other amount of power to the discharge lamp 20 is carried out in the same manner. Thus, the control for varying the AC power by the discharge lamp start control unit 10 is performed so that the discharge lamp 20 is supplied with a square wave AC voltage VL1 as illustrated in FIG. 4(A) and with a square wave AC current IL2 with a small amplitude as illustrated in FIG. 4(B). The first power P1 is a product of the AC voltage VL1 and the AC current IL2.

Figure 5A:
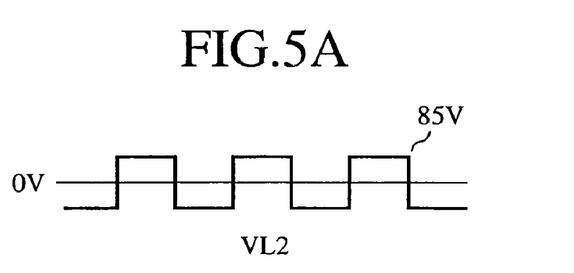
FIG. 5 is a timing chart illustrating the start operation of the embodiment 1 of the discharge lamp starter in accordance with the present invention.
Figure 5B:
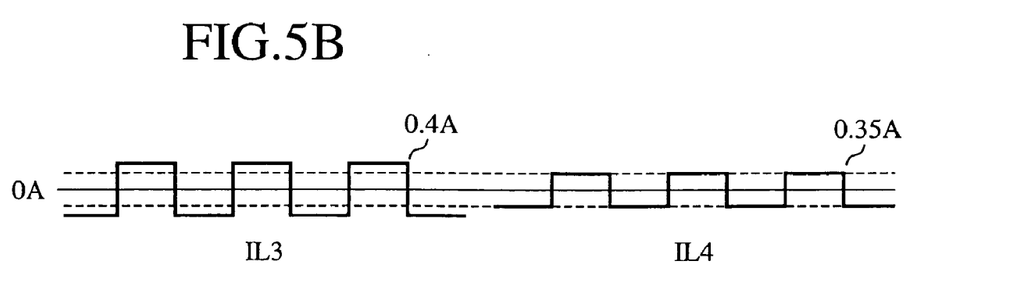

The supply of the first power P1 causes the discharge lamp 20 to gradually increase its temperature until it starts lighting and increases its luminance. In this case, since the first power P1 is small, it takes rather long time for the discharge lamp 20 to increase the temperature and to reach the stable lighting state. The problem of reducing the visibility does not occur because it is the lighting in the DRL mode. After a specified time period has elapsed, the microcomputer 30 supplies the discharge lamp 20 with the second power P2 (29 W, for example) smaller than the first power P1 to continue the low luminance in the DRL mode. Thus, the discharge lamp 20 is supplied with a square wave AC voltage VL2 (85 V, for example) as illustrated in FIG. 5(A) and with a square wave AC current IL4 with a small amplitude (0.35 A, for example) as illustrated in FIG. 5(B). The second power P2 is a product of the AC voltage VL2 and the AC current IL4. In this way, the discharge lamp 20 maintains the stable lighting at the low luminance.

Next, the operation will be described of the transition from the DRL mode, in which only the ignition switch SW1 is in the on state, to the normal light mode in response to the turning on of the lighting switch SW2. When the lighting switch SW2 is turned on in the state in which only the ignition switch SW1 is conducting, the voltage input circuit 13 enables the LG signal.

Detecting that both the IG signal and LG signal fed from the voltage input circuit 13 are enabled, the microcomputer 30 supplies the discharge lamp 20 with the fourth power P4 (35 W, for example) to shift the mode from the DRL mode to the normal light mode. Thus, the discharge lamp 20 is supplied with the square wave AC voltage VL2 (85 V, for example) as illustrated in FIG. 5(A) and with a square wave AC current IL3 with a large amplitude (0.4 A, for example) as illustrated in FIG. 5(B). The fourth power P4 is a product of the AC voltage VL2 and the AC current IL3.

The supply of the fourth power P4 causes the discharge lamp 20 to shift to the high luminance lighting. In this case, since the temperature of the discharge lamp 20 has been raised already, when the power supplied to the discharge lamp 20 changes from the second power P2 to the fourth power P4, the discharge lamp 20 is switched from the low luminance lighting to the high luminance lighting quickly. After that, the discharge lamp 20 maintains the stable high luminance lighting.

Next, the operation will be described of the transition from the normal light mode in which both the ignition switch SW1 and lighting switch SW2 are conducting to the DRL lighting mode caused by turning off the lighting switch SW2. When the lighting switch SW2 is turned off, the voltage input circuit 13 disables the LG signal.

Detecting that the IG signal fed from the voltage input circuit 13 is enabled and the LG signal is disabled, the microcomputer 30 supplies the discharge lamp 20 with the power that varies stepwise from the fourth power P4 to the second power P2 to make transition to the DRL mode gradually. Thus, the discharge lamp 20 is supplied with the AC current that varies stepwise from the square wave AC voltage VL2 (85 V, for example) as illustrated in FIG. 5(A) and the square wave AC current IL3 with a large amplitude (0.4 A, for example) as illustrated in FIG. 5(B) to the square wave AC current IL4 with a small amplitude (0.35 A, for example). In this way, the discharge lamp 20 gradually reduces the luminance from the high luminance until it finally maintains the stable lighting at the low luminance.

Next, the operation will be described of the transition from the state, in which only the lighting switch SW2 is conducting, but the ignition switch SW1 is not, to the normal light mode. When the lighting switch SW2 is turned on, the voltage input circuit 13 enables the LG signal. On the other hand, since the ignition switch SW1 remains the off state, the voltage input circuit 13 disables the IG signal.

Detecting that the IG signal fed from the voltage input circuit 13 is disabled, and the LG signal is enabled, the microcomputer 30 supplies the discharge lamp 20 with the large third power P3 (75 W, for example) to start lighting in the normal light mode. Thus, the discharge lamp 20 is supplied with the square wave AC voltage VL1 as illustrated in FIG. 4(A) and the square wave AC current IL1 with the large amplitude as illustrated in FIG. 4(B). The third power P3 is a product of the AC voltage VL1 and the AC current IL1.

The supply of the third power P3 causes the discharge lamp 20 to increase the temperature sharply in a short time until it starts lighting at the high luminance. After a specified time period has elapsed, the microcomputer 30 supplies the discharge lamp 20 with the fourth power P4 (35 W, for example) smaller than the third power P3 and greater than the second power P2 to maintain the high luminance in the normal light mode. Thus, the discharge lamp 20 is supplied with a square wave AC voltage VL2 (85 V, for example) as illustrated in FIG. 5(A) and with a square wave AC current IL3 with a large amplitude (0.4 A, for example) as illustrated in FIG. 5(B). In this way, the discharge lamp 20 maintains the stable lighting at the high luminance.

Next, the processing of the microcomputer 30 for carrying out the foregoing normal light and DRL will be described in more detail.

Figure 6:
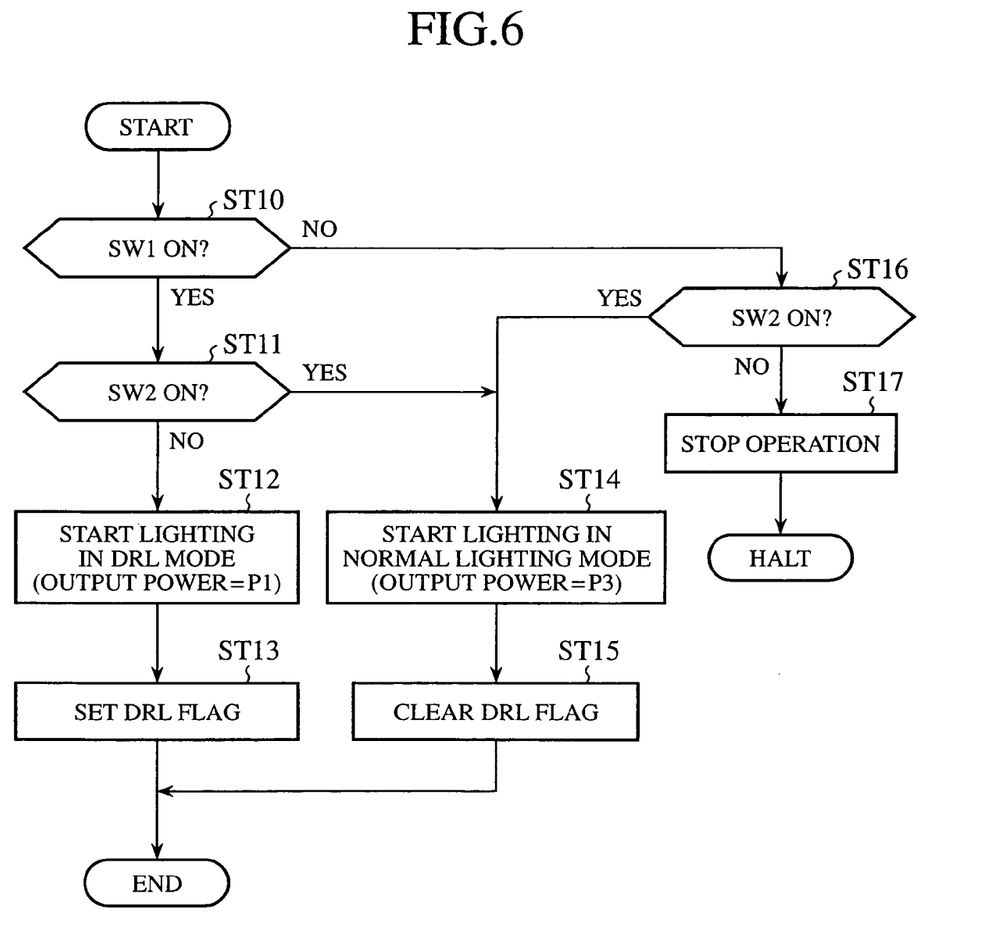
FIG. 6 is a flowchart illustrating the operation at the start of lighting of the embodiment 1 of the discharge lamp starter in accordance with the present invention.

First, the lighting start processing performed in response to the initial manipulation of the ignition switch SW1 and/or lighting switch SW2 will be described with reference to the flowchart illustrated in FIG. 6.

In the lighting start processing, the microcomputer 30 checks whether the ignition switch SW1 is in the on state or not (step ST10) by detecting whether the IG signal is enabled or not. Although not shown in the drawings, to check whether the ignition switch SW1 is in the on state or not, filtering processing is carried out to circumvent the chattering resulting from the operation of the ignition switch SW1. In the filtering processing, the microcomputer 30 makes a decision that the ignition switch SW1 is turned on when the enabled state of the IG signal continues for more than a predetermined time period. Likewise, the microcomputer 30 makes a decision that the ignition switch SW1 is turned off when the disabled state of the IG signal continues for more than a predetermined time period.

Detecting that the ignition switch SW1 is conducting at step ST10, the microcomputer 30 checks whether the lighting switch SW2 is in the on state or not (step ST11) by detecting whether the LG signal is enabled or not. Although not shown in the drawings, to check whether the lighting switch SW2 is in the on state or not, filtering processing is carried out to circumvent the chattering resulting from the operation of the lighting switch SW2. In the filtering processing, the microcomputer 30 makes a decision that the lighting switch SW2 is turned on when the enabled state of the LG signal continues for more than a predetermined time period. Likewise, the microcomputer 30 makes a decision that the lighting switch SW2 is turned off when the disabled state of the LG signal continues for more than a predetermined time period.

When the microcomputer 30 makes a decision at step ST11 that only the ignition switch SW1 is turned on while the lighting switch SW2 remains the off state, the microcomputer 30 carries out the processing to start lighting the discharge lamp 20 in the DRL mode (step ST12). In other words, the microcomputer 30 in the control circuit 14 supplies the first power P1 (35 W, for example) to the discharge lamp 20. Thus, the discharge lamp 20 starts lighting with increasing the luminance gradually.

Figure 7:
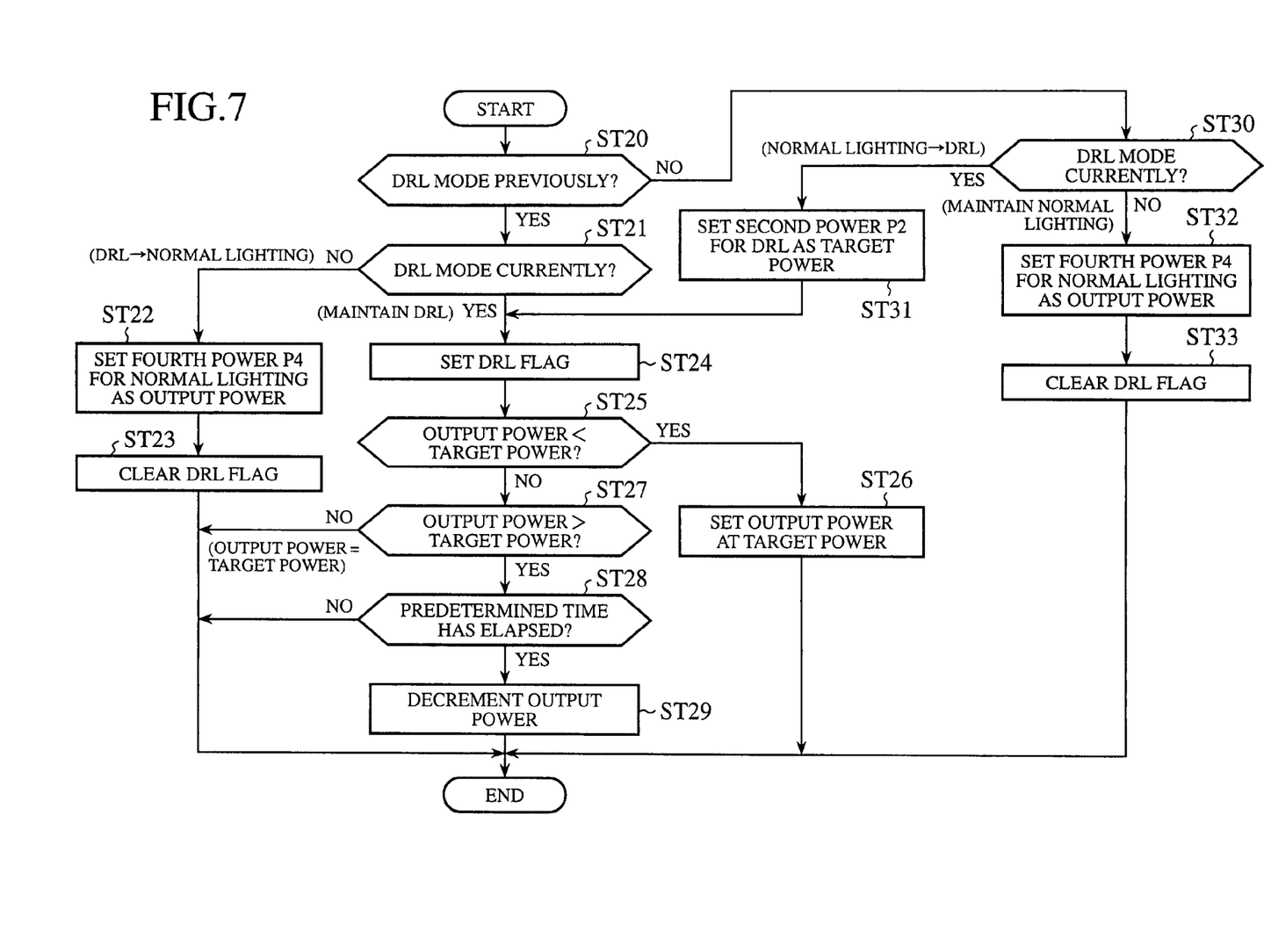
FIG. 7 is a flowchart illustrating the operation at the switching between lighting modes in the embodiment 1 of the discharge lamp starter in accordance with the present invention.

Subsequently, the microcomputer 30 sets the DRL flag (step ST13). The DRL flag, which is placed in the microcomputer 30, is used for checking whether the previous mode was the DRL mode or not in the subsequent output power switching processing. Thus, the microcomputer 30 memorizes that the previous mode was the DRL mode by the processing at step ST13. After that, the sequence proceeds to the output power switching processing as illustrated in FIG. 7.

When the microcomputer 30 makes a decision at step ST11 that both the ignition switch SW1 and lighting switch SW2 are conducting, processing is performed of starting lighting in the normal light mode (step ST14). In other words, the microcomputer 30 in the control circuit 14 supplies the third power P3 (75 W, for example) to the discharge lamp 20. Thus, the discharge lamp 20 starts lighting with increasing the luminance sharply.

Subsequently, the microcomputer 30 clears the DRL flag (step ST15). Thus, the microcomputer 30 memorizes that the previous mode was the normal light mode rather than the DRL mode. After that, the sequence proceeds to the output power switching processing as illustrate in FIG. 7.

When the microcomputer 30 makes a decision at step ST10 that the ignition switch SW1 is not in the on state, it checks whether the lighting switch SW2 is in the on state or not (step ST16). When the microcomputer 30 makes a decision that the lighting switch SW2 is conducting, it branches the sequence to step ST14 and carries out the processing to start lighting in the normal light mode (step ST14 and ST15). After that, the sequence proceeds to the output power switching processing as illustrated in FIG. 7.

When the microcomputer 30 makes a decision at step ST16 that the lighting switch SW2 is not conducting, it carries out halting processing (step ST17). When neither the ignition switch SW1 nor lighting switch SW2 is conducting, the microcomputer 30 is inoperable because the discharge lamp start control unit 10 is not supplied with power. However, if the microcomputer 30 makes a decision that both the ignition switch SW1 and lighting switch SW2 are in the off state, the microcomputer considers the discharge lamp starter to be failed, and carries out the control of stopping the operation of the discharge lamp starter.

Next, the output power switching processing, which is performed when the ignition switch SW1 and/or lighting switch SW2 is manipulated after the lighting start processing, will be described with reference to the flowchart illustrated in FIG. 7. The processing of FIG. 7 is carried out repeatedly at regular intervals.

In the output power switching processing, the microcomputer 30 checks first whether the previous mode is the DRL mode or not (step ST20) by detecting whether the DRL flag is set or not. When the microcomputer 30 makes a decision that the previous mode is the DRL mode, it checks whether the current mode is the DRL mode or not (step ST21). The microcomputer 30 carries out the processing by checking whether the ignition switch SW1 is in the on state and the lighting switch SW2 is in the off state according to the IG signal and LG signal fed from the voltage input circuit 13.

When the microcomputer 30 makes a decision at step ST21 that the current mode is not the DRL mode, it recognizes that the mode is switched from the DRL mode to the normal light mode, and sets the output power at the fourth power P4 for the normal light mode (step ST22). Thus, the power supplied to the discharge lamp 20 is switched from the second power P2 (29 W, for example) to the fourth power P4 (35 W, for example). Accordingly, the discharge lamp 20 is switched from the low luminance lighting to the high luminance lighting quickly. Subsequently, the microcomputer 30 clears the DRL flag (step ST23). Thus, the output power switching processing when the DRL mode is switched to the normal light mode is completed.

When the microcomputer 30 makes a decision at step ST21 that the current mode is the DRL mode, it recognizes that the DRL mode is maintained, and sets the DRL flag (step ST24). Subsequently, the microcomputer 30 checks whether the output power is smaller than the target power or not (step ST25). Here, the term "output power" refers to the power determined by the output voltage signal $V_L$ and the output current signal $I_L$ output from the DC/AC converter 12. The term "target power" refers to the second power P2 (29 W, for example) that is set as the target value for reducing the output power at the following step ST31 when the normal light mode is switched to DRL mode.

When the microcomputer 30 makes a decision at step ST25 that the output power is smaller than the target power, it sets the output power at the target power (step ST26), and completes the output power switching processing. This achieves the protective function of preventing the output power to reduce too much below the target power (29 W, for example).

When the microcomputer 30 makes a decision at step ST25 that the output power is not less than the target power, it checks whether the output power is greater than the target power (step ST27). When the microcomputer 30 makes a decision that the output power is not more than the target power, it recognizes that the output power is equal to the target power. In other words, it recognizes that the lighting is carried out in the DRL mode normally, thereby completing the output power switching processing.

In contrast, when the microcomputer 30 makes a decision at step ST27 that the output power is greater than the target power, it recognizes that the transition is on the way from the normal light mode to the DRL mode, and checks whether the predetermined time period has elapsed or not (step ST28). The predetermined time period is the time necessary for the output power to stabilize from the time it is changed (that is, when the output power during the DRL mode is greater than the target power, the predetermined time period is defined as the time period in which the previous output power is maintained from the previous update to the next update of the output power). When the microcomputer 30 makes a decision that the predetermined time period has not yet elapsed, it recognizes that the time of decrementing the output power has not yet come, and completes the output power switching processing.

On the other hand, when the microcomputer 30 makes a decision at step ST28 that the predetermined time period has elapsed, it decrement the output power (step ST29), and completes the output power switching processing. The processing at steps ST28 and ST29 enables the power supplied to the discharge lamp 20 to be reduced stepwise from the fourth power P4 to the second power P2 during the transition from the normal light mode to the DRL mode.

When the microcomputer 30 makes a decision at step ST20 that the previous mode was not the DRL mode, it checks whether the current mode is switched to the DRL mode or not (step ST30) If the microcomputer 30 makes a decision at step ST30 that the current mode is the DRL mode, it recognizes that the normal light mode is switched to the DRL mode, and sets the output power at the second power P2 for the DRL mode (step ST31). Subsequently, the sequence is branched to step ST24. Thus, the microcomputer 30 carries out the processing of foregoing steps ST24–ST29 so that the discharge lamp 20 is supplied with the power continuously reducing from the fourth power P4 (35 W, for example) to the second power P2 (29 W, for example), and is switched from the high luminance lighting to the low luminance lighting stepwise.

When the microcomputer 30 makes a decision at step ST30 that the current mode is not the DRL mode, it recognizes that the normal light mode is maintained, and sets the output power at the fourth power P4 for the normal light mode (step ST32). Thus, the discharge lamp 20 is supplied with the fourth power P4 (35 W, for example), and maintains the high luminance lighting. Subsequently, the microcomputer 30 clears the DRL flag (step ST33). Thus, the output power switching processing for maintaining the normal light mode has been completed.

As describe above, the embodiment 1 of the discharge lamp starter in accordance with the present invention is configured such that when it starts the lighting of the discharge lamp 20 in the DRL mode, it supplies the first power P1 of a rather small amount to the discharge lamp 20 to increase the luminance gradually until it reaches the stable lighting state at the low luminance. Thus, it can suppress the current flowing across the electrodes of the discharge lamp 20 when it starts lighting the discharge lamp 20 in the DRL mode. As a result, it can curb the degradation of the electrodes of the discharge lamp 20, thereby being able to prolong the life of the discharge lamp 20. In this case, although it takes a considerable time from the start of lighting to the stable lighting of the discharge lamp 20, this poses no problem of impairing the visibility because the lighting is carried out in the DRL mode.

In addition, in the transition from the normal light mode to the DRL mode, the present embodiment 1 supplies the discharge lamp 20 with the power continuously varying from the fourth power P4 (35 W, for example) to the second power P2 (29 W, for example) so that the discharge lamp 20 varies gradually from the high luminance lighting to the low luminance lighting continuously. Accordingly, it can prevent the sudden impairment of the visibility because it can circumvent the sudden fall of the luminance of the discharge lamp 20.

Although the foregoing embodiment 1 employs the lighting switch SW2 to carry out switching between the normal light and the DRL, this is not essential. For example, a configuration is also possible which employs a photodetector instead of the lighting switch SW2 so that when the photodetector detects that the environmental illumination is higher than a specified value, that is, detects that it is the daytime, the discharge lamp 20 can be lit in the DRL mode, and otherwise, that is, detects that it is night, the discharge lamp 20 can be lit in the normal mode. According to the configuration, the discharge lamp 20 is automatically changed to the normal light mode when it becomes dark during traveling or when the vehicle enters a tunnel, and is automatically changed to the DRL mode at the break of day or when the vehicle exits the tunnel. Accordingly, the configuration can obviate the need for operating the switch, prevent the impairment of the visibility because of forgetting to turn on the headlights, and reduce the waste of the battery power because of forgetting to turn off the headlights.

What is claimed is:

1. A discharge lamp starter comprising:
   a discharge lamp which is lit at a luminance corresponding to a power supplied to the discharge lamp;
   a first switch which turns on and off a power supply circuit;
   a second switch which turns on and off the power supply circuit; and
   a discharge lamp start control unit which causes the discharge lamp to operate as a daytime running light if the discharge lamp start control unit receives a signal indicating an on state only from the first switch, by supplying a first power to the discharge lamp to start lighting of the discharge lamp operating as the daytime running light, followed by supplying a second power smaller than the first power to the discharge lamp to maintain lighting of the discharge lamp operating as the daytime running light; and which causes the discharge lamp to operate as a nighttime running light if the discharge lamp start control unit receives a signal indicating an on state from the second switch, by supplying a third power greater than the first power to the discharge lamp to start lighting of the discharge lamp operating as the nighttime running light, followed by supplying a fourth power smaller than the third power and greater than the second power to the discharge lamp to maintain lighting of the discharge lamp operating as the nighttime running light.

2. The discharge lamp starter according to claim 1, wherein the discharge lamp start control unit causes the discharge lamp to transition from operating as the daytime running light to operating as the nighttime running light if the discharge lamp start control unit receives the signal indicating the on state of the second switch when the discharge lamp is operating as the daytime running light, by changing the power supplied to the discharge lamp from the second power to the fourth power; and wherein the discharge lamp start control unit causes the discharge lamp to transition from operating as the nighttime running light to operating as the daytime running light if the discharge lamp start control unit receives a signal indicating an off state of the second switch when the discharge lamp is operating as the nighttime running light, by continuously reducing the power supplied to the discharge lamp from the fourth power to the second power.

3. The discharge lamp starter according to claim 2, wherein the first switch is an ignition switch for starting a vehicle, and the second switch is a lighting switch for turning on a headlight comprising the discharge lamp.

4. A discharge lamp starter comprising:
   a discharge lamp which is lit at a luminance corresponding to a power supplied to the discharge lamp;
   a first switch which turns on and off a power supply circuit;
   a photodetector which turns on and off the power supply circuit, the photodetector turning off the power supply circuit if an amount of environmental illumination exceeds a predetermined threshold;
   a discharge lamp start control unit which causes the discharge lamp to operate as a daytime running light if the discharge lamp start control unit receives a signal indicating an on state only from the first switch, by supplying a first power to the discharge lamp to start lighting of the discharge lamp operating as the daytime running light, followed by supplying a second power smaller than the first power to the discharge lamp to maintain lighting of the discharge lamp operating as the daytime running light; and which causes the discharge lamp to operate as a nighttime running light if the discharge lamp start control unit receives a signal indicating an on state from the photodetector, by supplying a third power greater than the first power to the discharge lamp to start lighting of the discharge lamp operating as the nighttime running light, followed by supplying a fourth power smaller than the third power and greater than the second power to the discharge lamp to maintain lighting of the discharge lamp operating as the nighttime running light.

5. The discharge lamp starter according to claim 4, wherein the discharge lamp start control unit causes the discharge lamp to transition from operating as the daytime running light to operating as the nighttime running light if the discharge lamp start control unit receives the signal indicating the on state of the photodetector when the discharge lamp is operating as the daytime running light, by changing the power supplied to the discharge lamp from the second power to the fourth power; and wherein the discharge lamp start control unit causes the discharge lamp to transition from operating as the nighttime running light to operating as the daytime running light if the discharge lamp start control unit receives a signal indicating an off state of the photodetector when the discharge lamp is operating as the nighttime running light, by continuously reducing the power supplied to the discharge lamp from the fourth power to the second power.

6. The discharge lamp starter according to claim 5, wherein the first switch is an ignition switch for starting a vehicle.

* * * * *